(12) United States Patent
Wang et al.

(10) Patent No.: US 12,429,754 B2
(45) Date of Patent: Sep. 30, 2025

(54) OPAQUE PROJECTOR DEVICE FOR DISPLAY

(71) Applicant: NATIONAL TAIWAN OCEAN UNIVERSITY, Keelung (TW)

(72) Inventors: Jung-Chang Wang, Keelung (TW); Tsan-En Deng, Keelung (TW)

(73) Assignee: NATIONAL TAIWAN OCEAN UNIVERSITY, Keelung (TW)

( * ) Notice: Subject to any disclaimer, the term of this patent is extended or adjusted under 35 U.S.C. 154(b) by 385 days.

(21) Appl. No.: 18/058,402

(22) Filed: Nov. 23, 2022

(65) Prior Publication Data

US 2024/0168364 A1    May 23, 2024

(51) Int. Cl.
*G06F 1/16* (2006.01)
*G03B 17/54* (2021.01)
*G03B 21/14* (2006.01)

(52) U.S. Cl.
CPC .......... *G03B 21/145* (2013.01); *G03B 17/54* (2013.01)

(58) Field of Classification Search
CPC . G06F 1/1607; G06F 1/1605; F16M 2200/02; F16M 2200/061
See application file for complete search history.

(56) References Cited

U.S. PATENT DOCUMENTS 7,066,664 B1 *  6/2006  Sitoh .................... F16M 11/126
                                                    396/428

FOREIGN PATENT DOCUMENTS

| CN | 1387080 A | 12/2002 |
|----|-----------|---------|
| CN | 205080355 U | 3/2016 |
| CN | 111610636 A | 9/2020 |
| TW | 200743895 A | 12/2007 |
| TW | M416784 U | 11/2011 |

OTHER PUBLICATIONS

Office Action with appended Search Report, which was issued to Taiwanese counterpart application No. 110122486 issued on Apr. 11, 2022.

* cited by examiner

*Primary Examiner* — Ryan D Howard
(74) *Attorney, Agent, or Firm* — Muncy, Geissler, Olds & Lowe, P.C.

(57) ABSTRACT

The present disclosure relates to an opaque projector device for a display with a hardware design of combination of the two bases and the joint part, which can efficiently set up the camera of capturing an image of the target object on the display of the electronic device, and by using a transmission device adopting an Arduino® Nano transmission line, the camera and the electronic device having the remote controller are electrically connected to each other in a wired or wireless communication. The user thus uses the remote controller to directly control a shutter of the camera to capture the image of the target object, and the image is displayed on the display of the electronic device. Thus, according to the solution provided by the present disclosure, it is convenient to control the image capture of the target object, and position of the captured image can be flexibly moved.

18 Claims, 8 Drawing Sheets

OPAQUE PROJECTOR DEVICE FOR DISPLAY

TECHNICAL FIELD

The present disclosure relates to an opaque projector device for a display, and in particular to, an opaque projector device which adopts two base parts and a joint part to set up a camera of capturing an image of a target object on the display.

RELATED ART

Since projectors come out with developments of science and technology, the projectors have been applied to various fields, from consumer products to high-tech products, and their application range is very wide. For example, the projector can be used in large-scale conference speeches to enlarge a target object to be projected by projection, or it can be applied to commercial projection screens or TVs for real-time presentation of presentation content.

Among types of projectors, the opaque projector is a more convenient projection tool. Users can directly present the target object on the projection screen without pre-making the target object into an electronic image or document file. In fact, the opaque projector mainly displays the image captured by the lens directly on the projection screen or computer screen by placing the target object within the image capturing range of the projector lens. Therefore, the opaque projector can effectively reduce the time for the briefing staff to prepare the briefing materials and can provide real-time changes in the real-time status of the subject matter. However, the lens setup of the opaque projector is mostly fixed. When the target object that the briefing staff wants to present is too far away from the projector or has too large volume, it is difficult for the briefing staff to place the target object in the image capturing range of the lens, so that it cannot effectively present the state or change of the target object to the audience. Therefore, how to use innovative hardware design to control the image capture of the target object effectively and conveniently, and how to flexibly move the position of the captured image is a problem that developers and researchers in related industries of the projectors make efforts to overcome and solve.

SUMMARY

To solve the technical problems in the related art, the present disclosure provides an opaque projector device for a display, which adopts two bases and one joint part to set up the camera of capturing an image of a target object on the display. The hardware design of combination of the two bases and the joint part can efficiently set up the camera of capturing an image of the target object on the display of the electronic device, and by using an transmission device adopting an Arduino® Nano transmission line, the camera and the electronic device having the remote controller are electrically connected to each other in a wired or wireless communication. The user thus can use the remote controller to directly control a shutter of the camera to capture the image of the target object, and the image can be displayed on the display of the electronic device. Thus, according to the solution provided by the present disclosure, it is convenient to control the image capture of the target object, and position of the captured image can be flexibly moved.

According to an objective of the present disclosure, the present disclosure provides an opaque projector device for a display, which is set up on the display of an electronic device, and the opaque projector device comprises a first base, a second base, a joint part, a base part and an image capturing module. The first base comprises a first fastener part and at least two first latches, wherein the first latch is fastened to first fastener part, and first latches clamp the display therebetween. The second base is disposed with the first base side by side, and comprises a second fastener part and at least two second latches, wherein the second latch is fastened to the second fastener part, and the second latches clamp the display therebetween. The joint part is disposed between the first base and the second base. The base part comprises a rotatable base, a fastener part, a support part and a first magnet, the rotatable base is disposed on a first groove of the joint part, the fastener part is fastened on the rotatable base, the support part is disposed on an upper end of the fastener part, and the first magnet is buried in the support part. The image capturing module comprises a camera and a second magnet disposed in the camera, wherein the camera is set up on the support part by attraction of the second magnet and the first magnet.

According to the opaque projector device for the display, wherein the image capturing module is electrically connected to the electronic device via a transmission device, and the electronic device is further linked to a remote controller, the remote controller controls operation of a shutter of the camera in the image capturing module, such that an image captured by the shutter is displayed on the display.

According to the opaque projector device for the display, wherein the image capturing module is electrically connected to the electronic device via the transmission device in one of a wired communication and a wireless communication.

According to the opaque projector device for the display, wherein the image capturing module is electrically connected to the electronic device via the transmission device in the wired communication, and the transmission device adopts an Arduino® Nano transmission line.

According to the opaque projector device for the display, wherein the electronic device is one of a desktop computer, a notebook and a pad.

According to the opaque projector device for the display, wherein a bottom surface of the first fastener part is sunken to form a second groove, and the first fastener part further comprises at least a third magnet disposed in the first accommodating space; the first latch further comprises a fourth magnet, a first fastener portion fastened to the second groove and a first support part disposed on a lower end of the first fastener portion, and the fourth magnet and the third magnet are attracted by each other.

According to the opaque projector device for the display, wherein the first accommodating space is further covered by a first cover, and the first fastener portion is further covered by a second cover.

According to the opaque projector device for the display, wherein a top surface of the second fastener part is opened to form a second accommodating space, and a bottom surface of the second fastener part is sunken to form a third groove, and the second fastener part further comprises at least a fifth magnet disposed in the second accommodating space; the second latch further comprises a sixth magnet, a second fastener portion fastened to the second groove and a second support part disposed on a lower end of the second fastener portion, and the sixth magnet and the fifth magnet are attracted by each other.

According to the opaque projector device for the display, wherein the second accommodating space is further covered by a third cover, and the second fastener portion is further covered by a fourth cover.

According to the opaque projector device for the display, wherein two ends of the joint part adjacent to the base part are respectively covered by a fifth cover and a sixth cover.

According to the opaque projector device for the display, wherein the first latches is further sleeved to the first fastener part.

According to the opaque projector device for the display, wherein a top surface of the first fastener part is opened to form first openings, and a top surface of the first latch is formed with a second opening which penetrates the first latch, and two first fixing parts pass through the first opening and the second opening.

According to the opaque projector device for the display, wherein the fastener part comprises a first sub fastener part and a second sub fastener part connected to the first sub fastener part face by face, the support part comprises a first sub support part connected to the first sub fastener part and a second sub support part connected to the first sub support part face to face and connected to the second sub fastener part, the first magnet is buried in the first sub support part and the second sub support part.

According to the opaque projector device for the display, wherein the second latches is further sleeved to the second fastener part.

According to the opaque projector device for the display, wherein a top surface of the second fastener part is opened to form third openings, and a top surface of the second latch is formed with a fourth opening which penetrates the second latch, and two second fixing parts pass through the third opening and the fourth opening.

According to the opaque projector device for the display, wherein a mechanical arm is further disposed between the joint part and the base part.

According to the opaque projector device for the display, wherein the mechanical arm further comprises a connection base set up on the joint part, an upper arm set up on an end of the connection base opposite to the joint part, an axial arm set up on an end of the upper arm opposite to the connection base and a camera arm set up on an end of the axial arm opposite to the upper arm, and the axial arm drives the camera arm to move back and forth in respect to the upper arm.

According to the opaque projector device for the display, wherein the connection base further comprises a first sub connection base and a second sub connection base connected to the first sub connection base face to face.

To sum up, the present disclosure relates to an opaque projector device for a display with a hardware design of combination of the two bases and the joint part, which can efficiently set up the camera of capturing an image of the target object on the display of the electronic device, and by using a transmission device adopting an Arduino® Nano transmission line, the camera and the electronic device having the remote controller are electrically connected to each other in a wired or wireless communication. The user thus can use the remote controller to directly control a shutter of the camera to capture the image of the target object, and the image can be displayed on the display of the electronic device. Thus, according to the solution provided by the present disclosure, it is convenient to control the image capture of the target object, and position of the captured image can be flexibly moved.

BRIEF DESCRIPTIONS OF DRAWINGS

The accompanying drawings are included to provide a further understanding of the present disclosure and are incorporated in and constitute a part of this specification. The drawings illustrate exemplary embodiments of the present disclosure and, together with the description, which are used to explain the principles of the present disclosure.

DETAILS OF EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1:
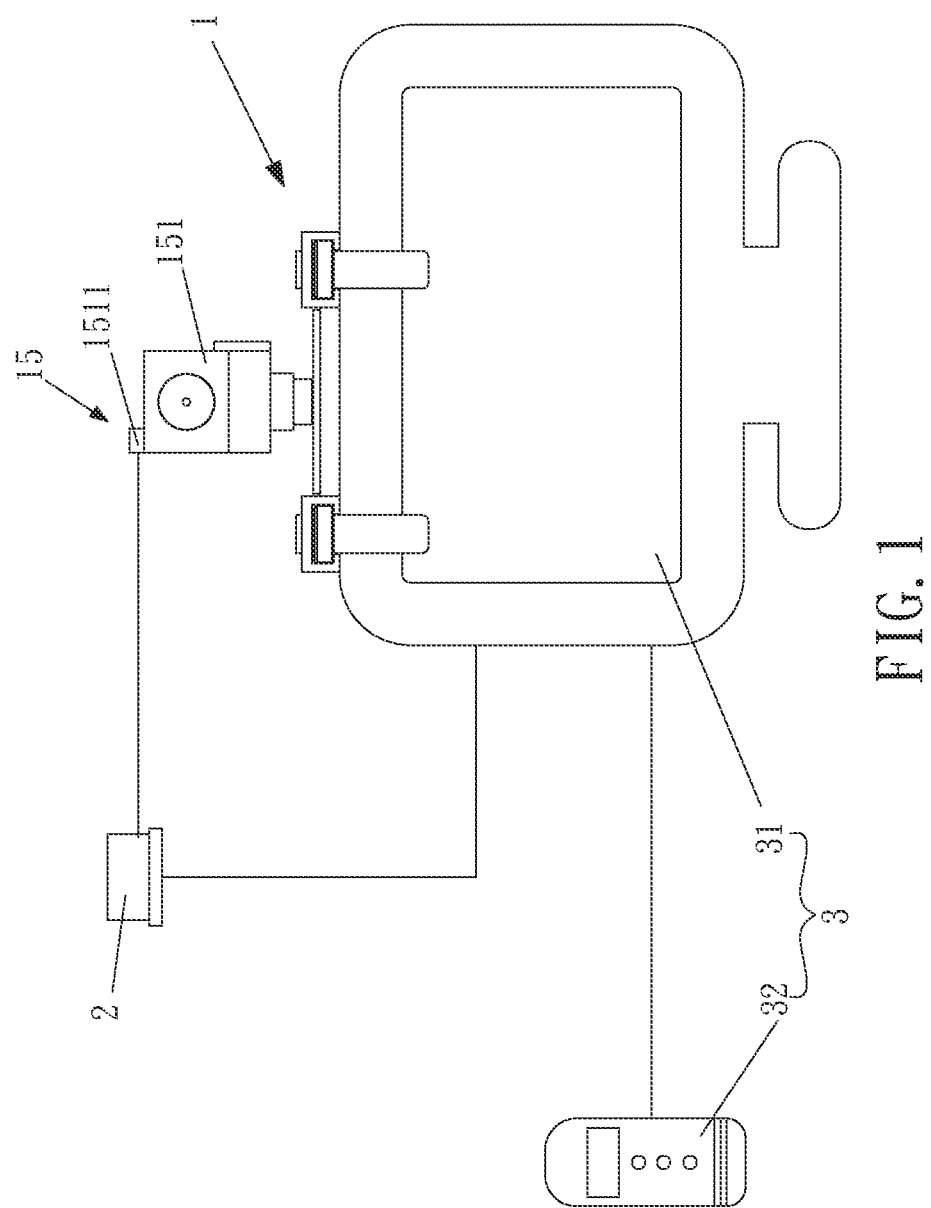
FIG. 1 is a schematic diagram showing connection of an opaque projector device for a display and an electronic device according to one embodiment of the present disclosure.

Firstly, refer to FIG. 1, and FIG. 1 is a schematic diagram showing connection of an opaque projector device for a display and an electronic device according to one embodiment of the present disclosure. The opaque projector device (1) for a display (31) is used to capture an image of a target object (not shown in drawings) to project the image of the target object on a screen, and the opaque projector device (1) is set up on the display (31) of an electronic device (3). The electronic device (3) can be electrically connected to the opaque projector device (1) via a transmission device (2) by using a wired or wireless communication. The electronic device (3) comprises a remote controller (32), and the remote controller (32) is linked the electronic device (3). The electronic device (3) is a desktop computer, a notebook and a pad. In an embodiment of the present disclosure, the opaque projector device (1) for the display (31) is electrically connected to the electronic device (3) in a wired communication via the transmission device (2) adopting an Arduino® Nano transmission line, the electronic device (3)

is the desktop computer, and the display (31) is a liquid crystal display (LCD) connected to the desktop computer. The user (not shown in drawings) can operate the remote controller (32) to control operation of a shutter (1511) of a camera (151) of in an image capturing module (15) to capture the image of the target object, and the image of the target object can be displayed on the display (31) of the electronic device (3). The opaque projector device (1) is formed by hardware design of combination of a first base (11), a second base (12) and a joint part (13), so as to clamp the camera (151) of capturing the image of the target object on the display (31) of the electronic device (3). By using the transmission device (2) which adopts an Arduino® Nano transmission line, the camera (151) can be electrically connected to the electronic device (3) with the remote controller (32) in a wired or wireless communication. The user thus can use the remote controller (32) to directly control the shutter (1511) of the camera (151) to capture the image of the target object, and the image of the target object can be displayed on the display (31) of the electronic device (3), Accordingly, it is convenient to control the image capture of the target object, and position of the captured image can be flexibly moved.

Figure 2:
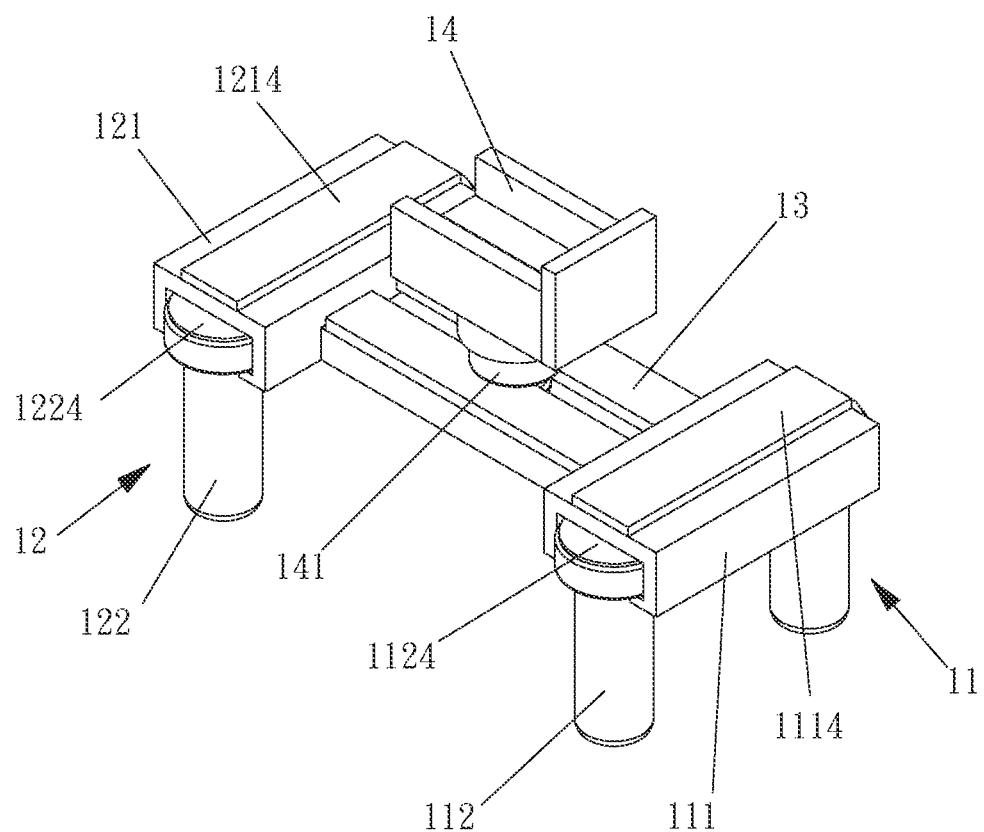
FIG. 2 is a schematic diagram showing a structure of an opaque projector device for a display according to a first embodiment of the present disclosure.
Figure 3:
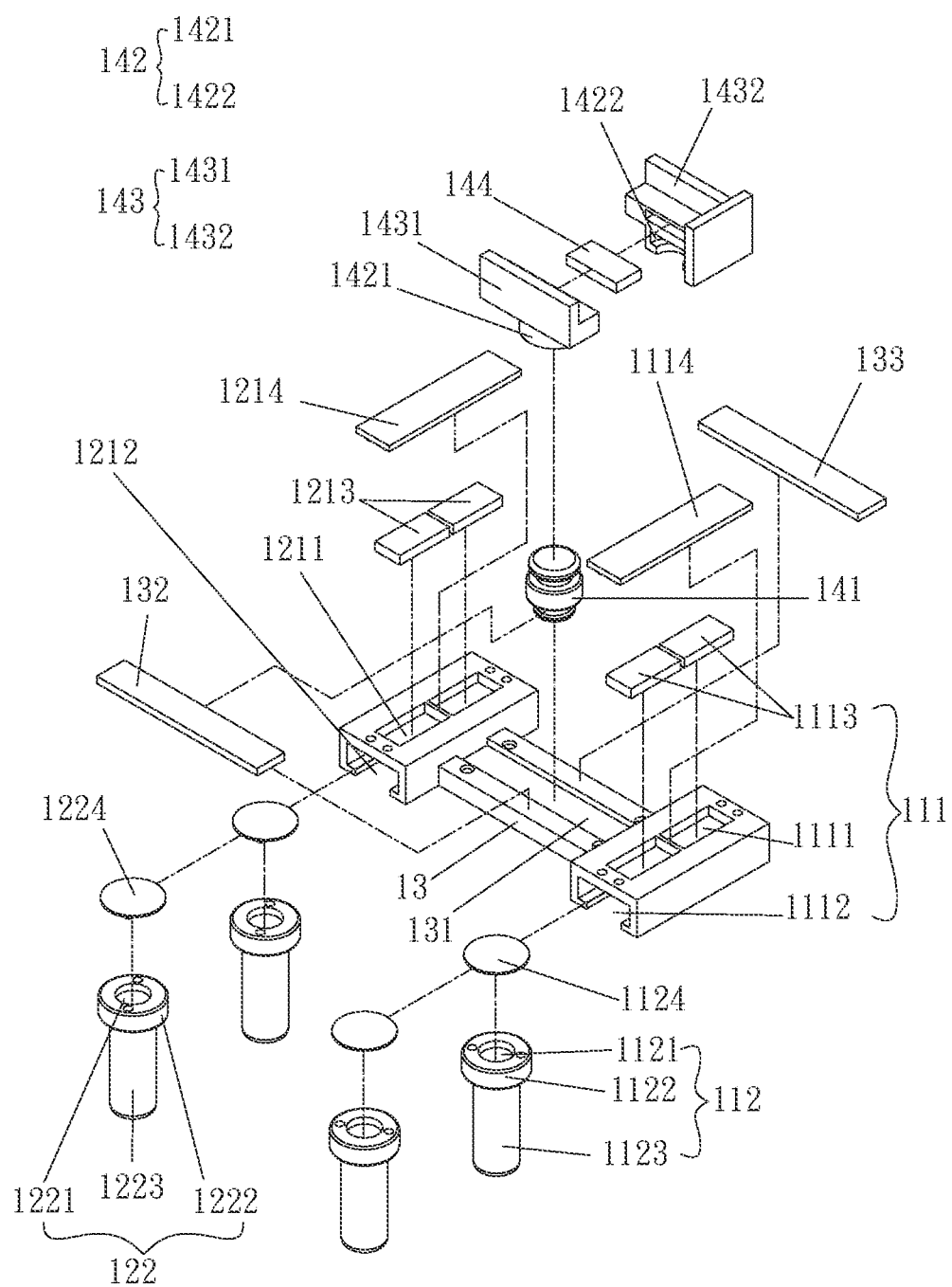
FIG. 3 is a schematic explosive diagram showing a structure of an opaque projector device for a display according to a first embodiment of the present disclosure.

Refer to FIG. 2 and FIG. 3, FIG. 2 is a schematic diagram showing a structure of an opaque projector device for a display according to a first embodiment of the present disclosure, and FIG. 3 is a schematic explosive diagram showing a structure of an opaque projector device for a display according to a first embodiment of the present disclosure. The opaque projector (1) device for the display (31) at least comprises a first base (11), a second base (12), a joint part (13), a base part (14) and an image capturing module (15).

The first base (11) at least comprises a first fastener part (111) and two first latches (112), wherein the first latches (112) are disposed side by side (or in parallel) and respectively fastened to lower ends of the first fastener part (111), and the first latches (112) and the first fastener part (111) are formed with an inverted-U shaped structure, such that the opaque projector device (1) for the display (31) is able to be clamped on an upper end of the LCD of the desktop computer.

Moreover, a top surface of the first fastener part (111) is opened to form a first accommodating space (1111), and a bottom surface of the first fastener part (111) is sunken to form a second groove (1112). The two third magnets (1113) are disposed in the first accommodating space (1111). The first latch (112) further comprises a fourth magnet (1121), a first fastener portion (1122) fastened to the second groove (1112) and a first support part (1123) disposed on a lower end of the first fastener portion (1122). The first accommodating space (1111) is covered by a first cover (1114), and the first fastener portion (1122) is covered by a second cover (1124), so as to prevent the third magnet (1113) and the fourth magnet (1121) from falling out and down. When the first fastener portion (1122) is fastened in the second groove (1112), the fourth magnet (1121) buried in the first fastener portion (1122) and the third magnet (1113) in the first accommodating space (1111) attract each other, such that the first base (11) forms an inverted-U shaped structure clamping on an upper end of the LCD of the desktop computer.

The second base (12) is disposed with the first base (11) side by side, the second base (12) at least comprises a second fastener part (121) and two second latches (122). The second latches (122) are disposed side by side and respectively fastened to the lower ends of the second fastener part (121), and the second latches (122) and the second fastener part (121) are formed with an inverted-U shaped structure as well as that formed by the first latches (112) and the first fastener part (111), such that the opaque projector device (1) for the display (31) is able to be clamped on an upper end of the LCD of the desktop computer.

Moreover, a top surface of the second fastener part (121) is opened to form a second accommodating space (1211), and a bottom surface of the second fastener part (121) is sunken to form a third groove (1212). Two fifth magnets (1213) are disposed in the second accommodating space (1211), and the second latch (122) comprises a second fastener portion (1222) and a second support part (1223), wherein the second fastener portion (1222) is fastened to the second groove (1112) and receives a sixth magnet (1221), and the second support part (1223) is disposed on a lower end of the second fastener portion (1222), wherein the second accommodating space (1211) is covered by a third cover (1214), and the second fastener portion (1222) is covered by a fourth cover (1224), so as to prevent the fifth magnet (1213) and the sixth magnet (1221) from falling out and down. When the second fastener portion (1222) is fastened in the third groove (1212), the sixth magnet (1221) buried in the second fastener portion (1222) and the fifth magnet (1213) in the second accommodating space (1211) attract each other, such that the second base (12) forms an inverted-U shaped structure clamping on an upper end of the LCD of the desktop computer.

The joint part (13) is disposed between the first base (11) and the second base (12), and that is, two ends of the joint part (13) are respectively fixed to the first base (11) and the second base (12), and the joint part (13) functions as a bridge for connecting the first base (11) and the second base (12). When the first base (11) and the second base (12) clamp on the display (31) of the electronic device (3), the joint part (13) is also disposed on the display (31), wherein the joint part (13) can be designed to contact the display (31) or not to contact the display (31).

The base part (14) at least comprises a rotatable base (141), a fastener part (142), a support part (143) and a first magnet (144), wherein the rotatable base (141) is disposed on the first groove (131) of the joint part (13), and two ends of the joint part (13) which are adjacent to the rotatable base (141) of the base part (14) are respectively covered by a fifth cover (132) and a sixth cover (133), so as to prevent the rotatable base (141) from falling down. The fastener part (142) is fasted to the rotatable base (141), the support part (143) is disposed on the upper end of the fastener part (142), and the first magnet (144) is buried in the support part (143), and that is, the fastener part (142) comprises a first sub fastener part (1421) and a second sub fastener part (1422) connected to the first sub fastener part (1421) face to face. The support part (143) comprises a first sub support part (1431) connected to the first sub fastener part (1421) and a second sub support part (1432) connected to the first sub support part (1431) face to face and connected to the second sub fastener part (1422). The first magnet (144) is buried in the first sub support part (1431) and the second sub support part (1432).

The image capturing module (15) comprises a camera (151) and a second magnet (not shown in drawings) disposed in the camera (151). The camera (151) is set up on the support part (143) of the base part (14) by attraction of the second magnet and the first magnet (144) of the base part (14), which can be seen in FIG. 7. The user can adjust the position or angle of the support part (143) to adjust a capturing angle of the camera (151) of the image capturing module (15), and the remote controller (32) is used to control the operation of the shutter (1511) of the camera (151) of the image capturing module (15), so as to capture the image of the target object, and the image of the target object can be displayed on the display (31) of the electronic device (3).

Figure 4:
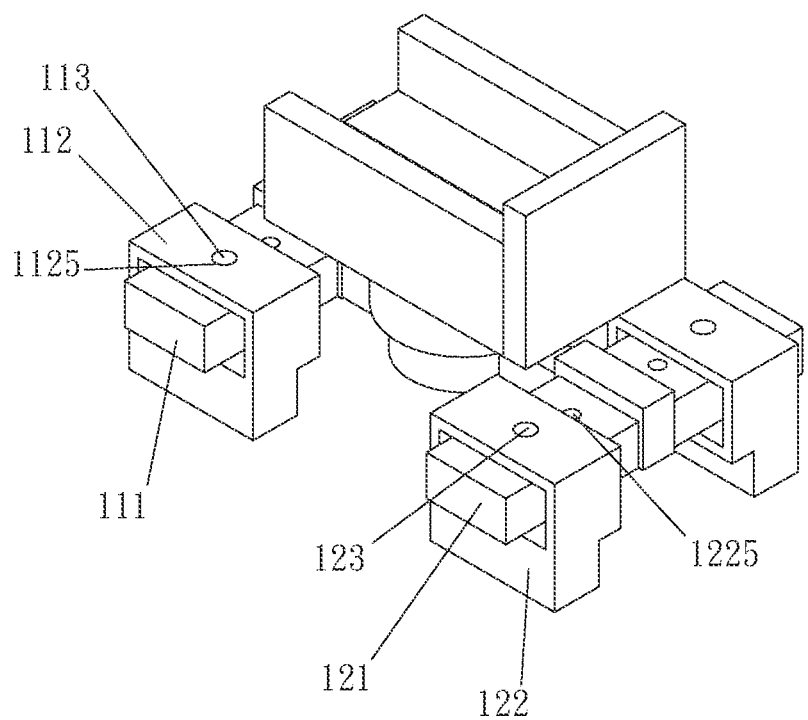
FIG. 4 is a schematic diagram showing a structure of an opaque projector device for a display according to a second embodiment of the present disclosure.
Figure 5:
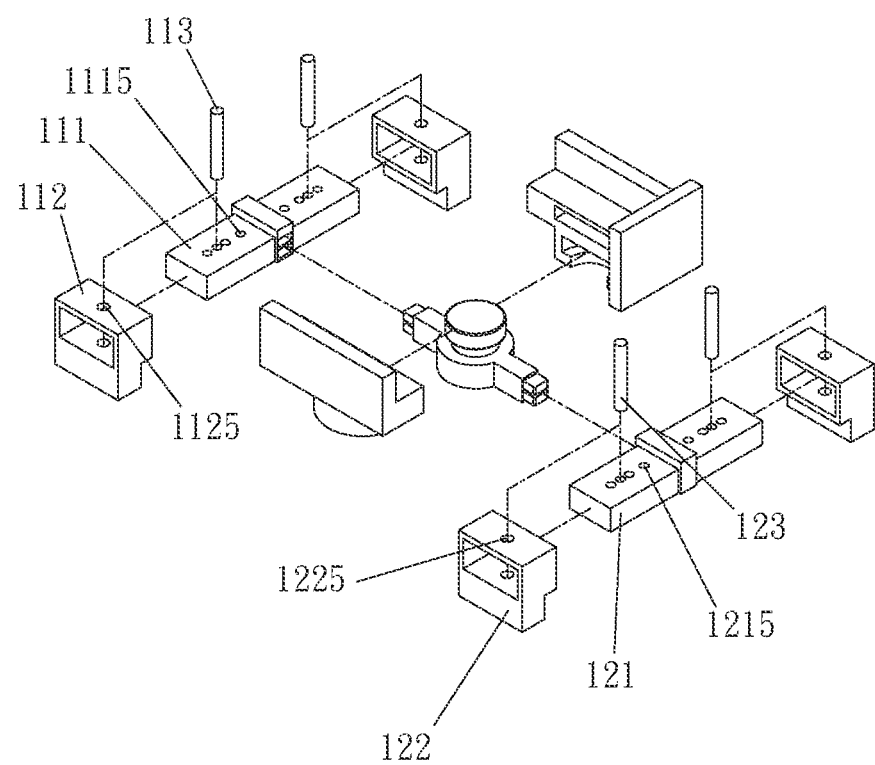
FIG. 5 is a schematic explosive diagram showing a structure of an opaque projector device for a display according to a second embodiment of the present disclosure.

Further, refer to FIG. 4 and FIG. 5, FIG. 4 is a schematic diagram showing a structure of an opaque projector device for a display according to a second embodiment of the present disclosure, and FIG. 5 is a schematic explosive diagram showing a structure of an opaque projector device for a display according to a second embodiment of the present disclosure. The opaque projector device (1) for the display (31) in the second embodiment is mostly like the opaque projector device (1) for the display (31) in the first embodiment, and the difference between the two embodiments is the connection of the joint part (13), the first base (11) and the second base (12).

The two first latches (112) are disposed side by side and sleeved to the first fastener part (111), wherein a top surface of the first fastener part (111) is opened to form first openings (1115), and a top surface of the first latch (112) is formed with a second opening (1125) which penetrates the first latch (112). Two first fixing parts (113) pass through the first opening (1115) and the second opening (1125), so as to fix the two first latches (112) to the first fastener part (111), and the user can adjust a distance between the two first latches (112) according to a width of the display (31). Further, the two second latches (122) are sleeved to the second fastener part (121). A top surface of the second fastener part (121) is opened to form third openings (1215), and a top surface of the second latch (122) is formed with a fourth opening (1225) which penetrates the second latch (122). Two second fixing parts (123) pass through the third opening (1215) and the fourth opening (1225), so as to fix the two second latches (122) to the second fastener part (121), and the user can adjust a distance between the two second latches (122) according to a width of the display (31), wherein the distance between the adjacent first openings (1115) of the first fastener part (111) is equal to the distance between the adjacent third openings (1215) of the second fastener part (121).

Figure 6:
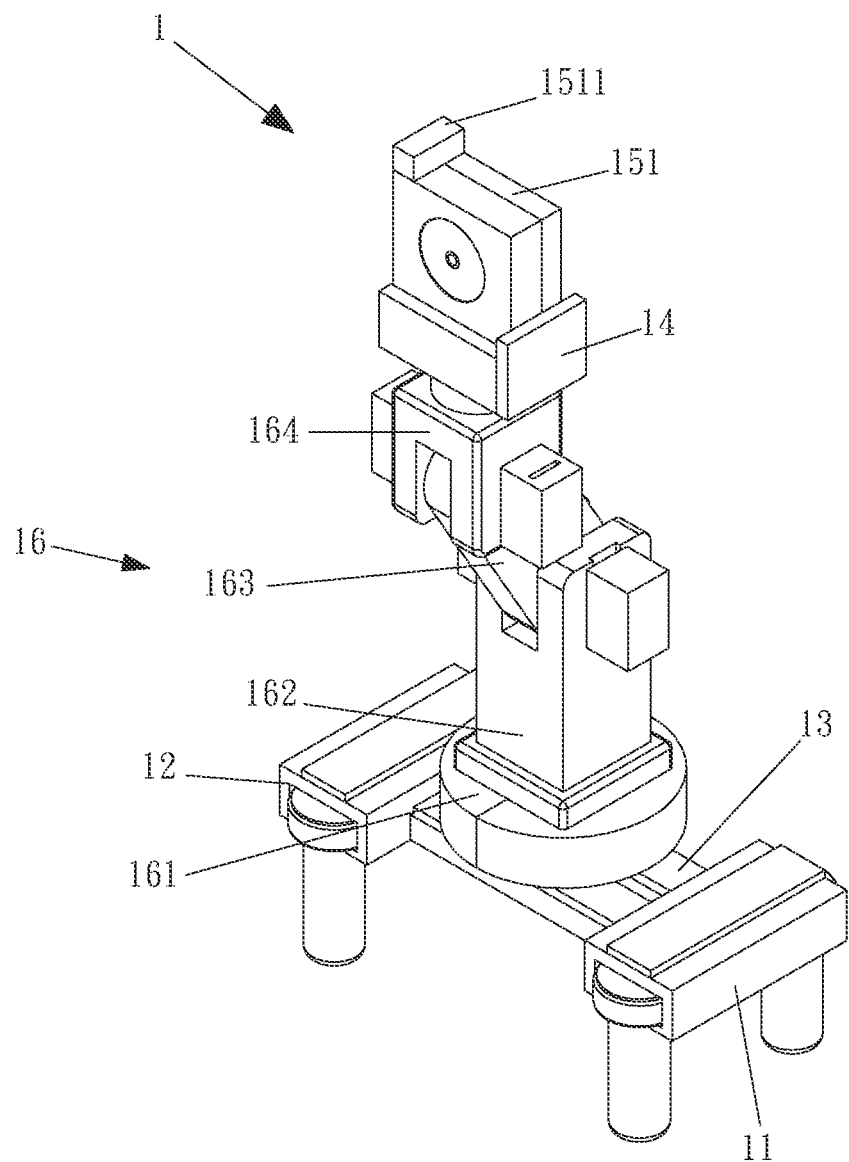
FIG. 6 is a schematic diagram showing a structure of an opaque projector device for a display according to a third embodiment of the present disclosure.
Figure 7:
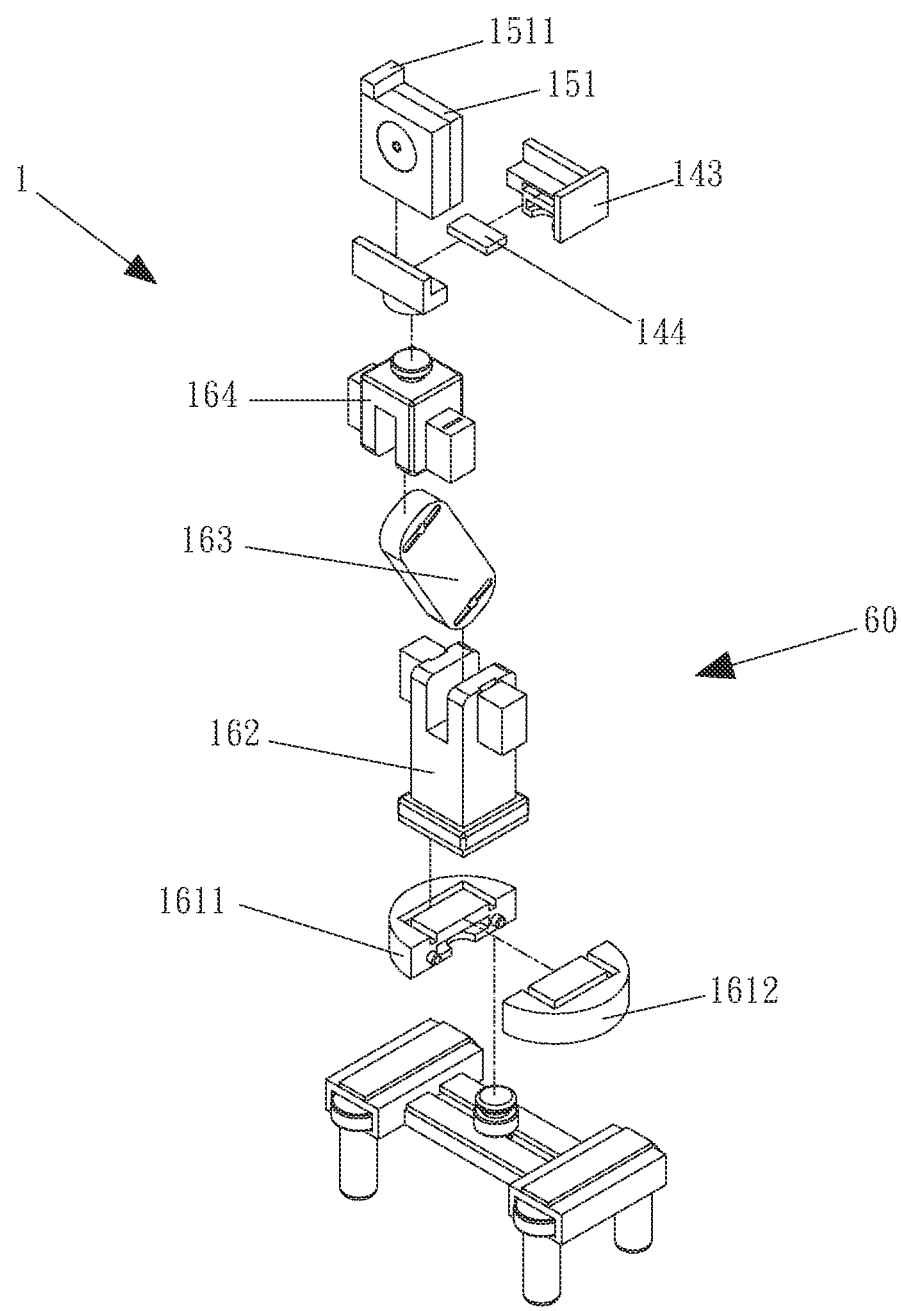
FIG. 7 is a schematic explosive diagram showing a structure of an opaque projector device for a display according to a third embodiment of the present disclosure.

Further, refer to FIG. 6 and FIG. 7, FIG. 6 is a schematic diagram showing a structure of an opaque projector device for a display according to a third embodiment of the present disclosure, and FIG. 7 is a schematic explosive diagram showing a structure of an opaque projector device for a display according to a third embodiment of the present disclosure. A mechanical arm (16) is further disposed between the joint part (13) and the base part (14). The mechanical arm (16) comprises a connection base (161), an upper arm (162), an axial arm (163) and a camera arm (164). The connection base (161) is set up on the joint part (13), and the connection base (161) comprises a first sub connection base (1611) and a second sub connection base (1612) connected to the first sub connection base (1611) face to face, such that to cover the joint part (13). The upper arm (162) is set up on an end of the connection base (161) opposite to the joint part (13) and contacts the connection base (161). The axial arm (163) is set up on an end of the upper arm (162) opposite to the connection base (161). The camera arm (164) is set up on an end of the axial arm (163) opposite to the upper arm (162), and the camera arm (164) is connected to the base part (14), such that the axial arm (163) can drive the camera arm (164) to move back and forth in respect to the upper arm (162).

Figure 8:
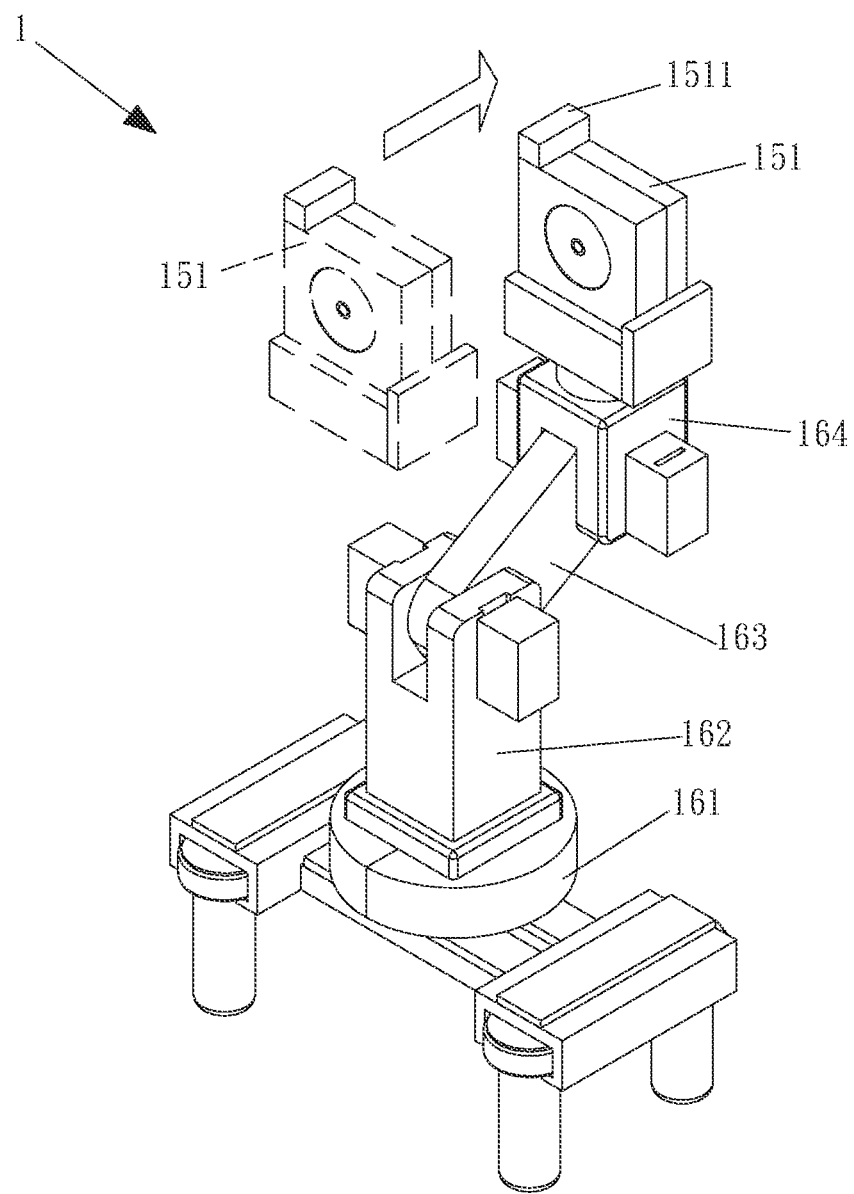
FIG. 8 is a schematic diagram showing operation of an opaque projector device for a display according to a third embodiment of the present disclosure.

Further refer to FIG. 8, and FIG. 8 is a schematic diagram showing operation of an opaque projector device for a display according to a third embodiment of the present disclosure. When the camera (151) of the image capturing module (15) is disposed on the base part (14) and connected to the camera arm (164), the camera arm (164) is connected to the axial arm (163) which is able to move back and forth in respect to the upper arm (162), and the axial arm (163) is disposed on the upper arm (162) and the connection base (161), the camera (151) of the image capturing module (15) can move back and forth to adjust the proper position of the camera (151) of capturing the image of the target object since the axial arm (163) is able to move back and forth in respect to the upper arm (162).

According to the descriptions of the embodiment, compared with the products in related prior art, the opaque projector device for the display of the present disclosure has the following advantages.

The opaque projector device for the display of the present disclosure adopts a hardware design of combination of the two bases and the joint part, which can efficiently set up the camera of capturing an image of the target object on the display of the electronic device, and by using a transmission device adopting an Arduino® Nano transmission line, the camera and the electronic device having the remote controller are electrically connected to each other in a wired or wireless communication. The user thus can use the remote controller to directly control a shutter of the camera to capture the image of the target object, and the image can be displayed on the display of the electronic device. Thus, according to the solution provided by the present disclosure, it is convenient to control the image capture of the target object, and position of the captured image can be flexibly moved.

In summary, the opaque projector device for the display of the present disclosure can indeed achieve the expected use effect by the embodiments disclosed above, and the opaque projector device for the display of the present disclosure has not been disclosed before the present disclosure is filed. Thus, the present disclosure is filed, and allowance of the present disclosure is requested respectfully.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An opaque projector device for a display, which is set up on the display of an electronic device, at least comprising: a first base, comprising a first fastener part and at least two first latches, wherein each of the at least two first latches is fastened to first fastener part, and the at least two first latches clamp the display therebetween; a second base, disposed with the first base side by side, comprising a second fastener part and at least two second latches, wherein each of the at least two second latches is fastened to the second fastener part, and the at least two second latches clamp the display therebetween; a joint part, disposed between the first base and the second base; a base part, comprising a rotatable base, a fastener part, a support part and a first magnet, the rotatable base is disposed on a first groove of the joint part, the fastener part is fastened on the rotatable base, the support part is disposed on an upper end of the fastener part, and the first magnet is buried in the support part; and an image capturing module, comprising a camera and a second magnet disposed in the camera, wherein the camera is set up on the support part by attraction of the second magnet and the first magnet.

2. The opaque projector device for the display of claim 1, wherein the image capturing module is electrically connected to the electronic device via a transmission device, and the electronic device is further linked to a remote controller, the remote controller controls operation of a shutter of the camera in the image capturing module, such that an image captured by the shutter is displayed on the display.

3. The opaque projector device for the display of claim 2, wherein the image capturing module is electrically connected to the electronic device via the transmission device in one of a wired communication and a wireless communication.

4. The opaque projector device for the display of claim 3, wherein the image capturing module is electrically connected to the electronic device via the transmission device in the wired communication, and the transmission device adopts a wired transmission line.

5. The opaque projector device for the display of claim 2, wherein the electronic device is one of a desktop computer, a notebook and a pad.

6. The opaque projector device for the display of claim 1, wherein a top surface of the first fastener part is opened to form a first accommodating space, and a bottom surface of the first fastener part is sunken to form a second groove, and the first fastener part further comprises at least a third magnet disposed in the first accommodating space; each of the at least two first latches further comprises a fourth magnet, a first fastener portion fastened to the second groove and a first support part disposed on a lower end of the first fastener portion, and the fourth magnet and the third magnet are attracted by each other.

7. The opaque projector device for the display of claim 6, wherein the first accommodating space is further covered by a first cover, and the first fastener portion is further covered by a second cover.

8. The opaque projector device for the display of claim 1, wherein a top surface of the second fastener part is opened to form a second accommodating space, and a bottom surface of the second fastener part is sunken to form a third groove, and the second fastener part further comprises at least a fifth magnet disposed in the second accommodating space; each of the at least two second latches further comprises a sixth magnet, a second fastener portion fastened to the second groove and a second support part disposed on a lower end of the second fastener portion, and the sixth magnet and the fifth magnet are attracted by each other.

9. The opaque projector device for the display of claim 8, wherein the second accommodating space is further covered by a third cover, and the second fastener portion is further covered by a fourth cover.

10. The opaque projector device for the display of claim 1, wherein two ends of the joint part adjacent to the base part are respectively covered by a fifth cover and a sixth cover.

11. The opaque projector device for the display of claim 1, wherein the fastener part comprises a first sub fastener part and a second sub fastener part connected to the first sub fastener part face by face, the support part comprises a first sub support part connected to the first sub fastener part and a second sub support part connected to the first sub support part face to face and connected to the second sub fastener part, the first magnet is buried in the first sub support part and the second sub support part.

12. The opaque projector device for the display of claim 1, wherein the at least two first latches are further sleeved to the first fastener part.

13. The opaque projector device for the display of claim 12, wherein a top surface of the first fastener part is opened to form first openings, and a top surface of each of the at least two first latches is formed with a second opening which penetrates the at least first latches, and two first fixing parts pass through the first opening and the second opening.

14. The opaque projector device for the display of claim 1, wherein the at least two second latches are further sleeved to the second fastener part.

15. The opaque projector device for the display of claim 14, wherein a top surface of the second fastener part is opened to form third openings, and a top surface of each of the at least two second latches is formed with a fourth opening which penetrates the at least two second latches, and two second fixing parts pass through the third opening and the fourth opening.

16. The opaque projector device for the display of claim 1, wherein a mechanical arm is further disposed between the joint part and the base part.

17. The opaque projector device for the display of claim 16, wherein the mechanical arm further comprises a connection base set up on the joint part, an upper arm set up on an end of the connection base opposite to the joint part, an axial arm set up on an end of the upper arm opposite to the connection base and a camera arm set up on an end of the axial arm opposite to the upper arm, and the axial arm drives the camera arm to move back and forth in respect to the upper arm.

18. The opaque projector device for the display of claim 17, wherein the connection base further comprises a first sub connection base and a second sub connection base connected to the first sub connection base face to face.

* * * * *